US012663506B2

(12) United States Patent
Finley et al.

(10) Patent No.: US 12,663,506 B2
(45) Date of Patent: Jun. 23, 2026

(54) ANTENNA OFFSET PRINCIPAL PLANE SIDELOBES FOR ENHANCED GROUND CLUTTER SUPPRESSION

(71) Applicant: Rockwell Collins, Inc., Cedar Rapids, IA (US)

(72) Inventors: Jeffery A. Finley, Cedar Rapids, IA (US); James B. West, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 282 days.

(21) Appl. No.: 18/433,147

(22) Filed: Feb. 5, 2024

(65) Prior Publication Data

US 2025/0251491 A1     Aug. 7, 2025

(51) Int. Cl.
| | |
|---|---|
| *G01S 7/28* | (2006.01) |
| *G01S 7/03* | (2006.01) |
| *G01S 13/88* | (2006.01) |
| *G05D 1/654* | (2024.01) |
| *G05D 109/22* | (2024.01) |
| *H01Q 3/02* | (2006.01) |
| *H01Q 15/24* | (2006.01) |

(52) U.S. Cl.
CPC .............. *G01S 7/2813* (2013.01); *G01S 7/03* (2013.01); *G01S 13/88* (2013.01); *G05D 1/6545* (2024.01); *H01Q 3/02* (2013.01); *H01Q 15/24* (2013.01); *G05D 2109/22* (2024.01)

(58) Field of Classification Search
CPC .. H01Q 21/061; H01Q 21/22; H01Q 21/0025; H01Q 3/26; H01Q 3/30; H01Q 19/062; G01S 7/2813; G01S 13/4463; G01S 13/933; G01S 13/953; G01S 2013/0254; G01S 2013/0263; G01S 2013/0245
USPC .......................... 342/188, 368, 379, 159, 154
See application file for complete search history.

(56) References Cited

U.S. PATENT DOCUMENTS

| | | | | | |
|---|---|---|---|---|---|
| 4,939,523 | A | * | 7/1990 | Jehle | H01Q 19/02 |
| | | | | | 343/705 |
| 5,083,130 | A | * | 1/1992 | Cardiasmenos | G01S 7/026 |
| | | | | | 342/54 |

(Continued)

FOREIGN PATENT DOCUMENTS

| | | |
|---|---|---|
| CN | 110726980 A | 1/2020 |
| EP | 0291920 A1 | 11/1988 |

(Continued)

OTHER PUBLICATIONS

European Patent Office, Extended European Search Report received in EP Application No. 25156100.7, Jun. 17, 2025, 9 pages.

*Primary Examiner* — Michael W Justice
(74) *Attorney, Agent, or Firm* — Sulter Swartz IP

(57) ABSTRACT

An electromechanically steered passive directional arrays and ESA antenna with the rectangular apertures' mathematically separable radiation pattern array lattice rotated to rotate the higher cardinal plane side lobes to ±45° relative to the vertical plane. Rotation minimizes clutter returns that mask weaker power returns and generates larger mean side lobe path loss. The higher sidelobe power levels are directed away from the critical area along the runway during approach. Individual array elements may be counter rotated to maintain desired antenna polarization state.

20 Claims, 7 Drawing Sheets

(56) References Cited

U.S. PATENT DOCUMENTS

| | | | | |
|---|---|---|---|---|
| 6,377,212 | B1 * | 4/2002 | Kinghorn | G01S 7/2813 |
| | | | | 342/149 |
| 8,154,455 | B2 * | 4/2012 | Landon | H04B 7/10 |
| | | | | 343/702 |
| 9,343,817 | B2 * | 5/2016 | Pan | H01Q 21/24 |
| 9,502,780 | B2 * | 11/2016 | Chau | H01Q 21/24 |
| 10,020,594 | B2 * | 7/2018 | Kim | H01Q 21/0037 |
| 10,270,185 | B2 * | 4/2019 | Boutayeb | H01Q 9/285 |
| 10,754,020 | B2 * | 8/2020 | Holt | G01S 13/4472 |
| 10,756,417 | B2 * | 8/2020 | Izadian | G01S 7/032 |
| 10,775,498 | B2 * | 9/2020 | Vacanti | G01S 13/4472 |
| 11,079,489 | B2 * | 8/2021 | Surace | G01S 13/60 |
| 11,143,756 | B2 * | 10/2021 | Vacanti | G01S 13/933 |
| 11,171,418 | B2 * | 11/2021 | Zihir | H01Q 3/26 |
| 11,280,880 | B2 | 3/2022 | West | |
| 11,506,775 | B2 * | 11/2022 | Holt | H01Q 1/525 |
| 11,515,993 | B1 * | 11/2022 | Reda | H04L 5/14 |
| 11,754,706 | B2 * | 9/2023 | Sishtla | G01S 7/414 |
| | | | | 342/26 B |
| 11,953,617 | B2 * | 4/2024 | Teague | G01S 13/90 |
| 12,055,625 | B2 * | 8/2024 | Song | G01S 7/352 |
| 12,265,174 | B2 * | 4/2025 | West | G01S 7/285 |
| 12,288,933 | B2 * | 4/2025 | Zhou | H01Q 1/08 |
| 12,333,953 | B2 * | 6/2025 | Ferla | G08G 5/26 |
| 12,366,655 | B2 * | 7/2025 | Helfrecht | G01S 13/913 |
| 12,458,547 | B2 * | 11/2025 | Johnson | A61F 13/15203 |
| 2012/0064825 | A1 * | 3/2012 | Landon | H04B 7/10 |
| | | | | 455/39 |
| 2014/0071018 | A1 * | 3/2014 | Pan | H01Q 21/24 |
| | | | | 343/867 |
| 2016/0211585 | A1 * | 7/2016 | Chau | H01Q 21/062 |
| 2017/0117638 | A1 * | 4/2017 | Kim | H01Q 21/08 |
| 2018/0175515 | A1 * | 6/2018 | Boutayeb | H01Q 21/30 |
| 2018/0246205 | A1 * | 8/2018 | Surace | G01S 13/953 |
| 2018/0259641 | A1 * | 9/2018 | Vacanti | G01S 13/953 |
| 2019/0064338 | A1 * | 2/2019 | Holt | H01Q 1/525 |
| 2019/0190133 | A1 * | 6/2019 | Izadian | H01Q 15/24 |
| 2019/0221947 | A1 * | 7/2019 | Zihir | H01Q 21/245 |
| 2020/0341132 | A1 * | 10/2020 | Holt | G01S 13/4463 |
| 2021/0132219 | A1 * | 5/2021 | Vacanti | G01S 7/35 |
| 2021/0215822 | A1 * | 7/2021 | Song | G01S 13/87 |
| 2022/0082687 | A1 * | 3/2022 | Sishtla | G01S 13/953 |
| 2022/0239009 | A1 * | 7/2022 | Zhou | H01Q 19/192 |
| 2022/0308165 | A1 * | 9/2022 | Teague | G01S 13/872 |
| 2022/0406203 | A1 * | 12/2022 | Ferla | G08G 5/26 |
| 2023/0012868 | A1 * | 1/2023 | Johnson | A61F 13/15203 |
| 2023/0353334 | A1 * | 11/2023 | Reda | H01Q 5/42 |
| 2023/0375699 | A1 * | 11/2023 | Helfrecht | G01S 7/28 |
| 2024/0266754 | A1 * | 8/2024 | Azuma | H01Q 21/24 |
| 2024/0319330 | A1 * | 9/2024 | West | G01S 7/282 |
| 2025/0015512 | A1 * | 1/2025 | Ingelhag | H01Q 21/061 |
| 2025/0076482 | A1 * | 3/2025 | West | G01S 13/933 |

FOREIGN PATENT DOCUMENTS

| | | | |
|---|---|---|---|
| EP | 3451016 | A1 | 3/2019 |
| EP | 3971613 | A1 | 3/2022 |
| EP | 4063893 | A1 | 9/2022 |
| EP | 3963671 | B1 | 10/2022 |
| EP | 4174514 | A1 | 5/2023 |
| GB | 1005379 | A | 9/1965 |

* cited by examiner

Antenna Array

100

102

Conventional HP Rectangular
Array Lattice's Radiation Pattern

104

High side lobes hit the runway and
create high levels of ground clutter

Runway

Lower Intercardinal Plane Side
Lobes not directly below the
aircraft and therefore don't
aide in Ground Clutter
Suppression in critically
needed areas Terrain

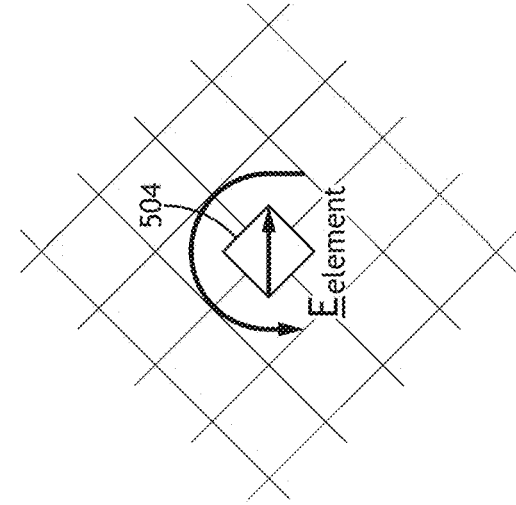

Counter Rotated Radiation Element
- Element is once again HP
- No polarization mismatch to HP target
- Low Intercardinal Side lobes Point Directly downward

Rotated Array Lattice
- Element is now slant 45 polarized
- 3 dB polarization mismatch to HP target
- Low Intercardinal Side Lobes point directly downward

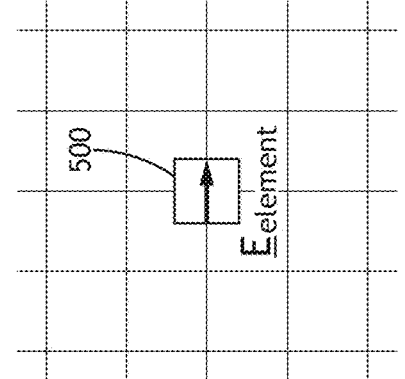

Original HP Rectangular Array Lattice
- Element is HP
- Cardinal Plane Side Lobes point directly downward

FIG.5A

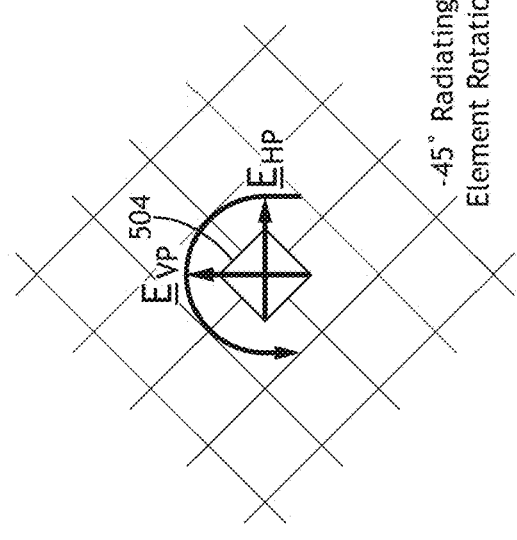

-45° Radiating Element Rotation

Counter Rotated Radiation Element
- Element is once again HP and VP
- No polarization mismatch to HP& VP targets of interest
- Low Intercardinal Side Lobes point directly downward +45° Array Lattice Rotation

Rotated Array Lattice
- Element is now switched slant +45° slant -45° polarized
- 3 dB polarization mismatch to HP target
- Low Intercardinal Side Lobes point directly downward
- It's possible to create HP and VP through mutli-pulse processing

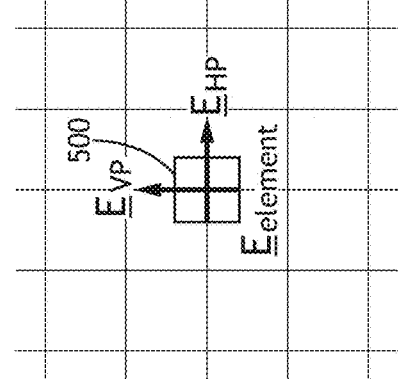

Original HP Rectangular Array Lattice
- Element is switched HP & VP
- Cardinal Plane Side Lobes point directly downward

FIG.5B

ANTENNA OFFSET PRINCIPAL PLANE SIDELOBES FOR ENHANCED GROUND CLUTTER SUPPRESSION

BACKGROUND

Electronically scanned array (electromechanically steered passive directional arrays and ESA antennas tend to have high side lobe levels, and traditionally they don't taper on transmit, only on receive. Side lobe levels end up being large compared to other technologies like slotted waveguide arrays.

Many radar modes suffer from high side lobe induced ground clutter, e.g., predictive wind shear. Rectangular aperture array lattices within directional antenna arrays place the cardinal plane side lobes directly downward, below and in front of the aircraft during runway approach, which in turn maximizes undesirable ground clutter which then masks weak power level radar returns that are critically important to detect.

SUMMARY

In one aspect, embodiments of the inventive concepts disclosed herein are directed to an electromechanically steered passive directional arrays and ESA antenna where the array with a rectangular element spacing lattice mathematically separable radiation pattern array lattice is rotated to rotate the higher cardinal plane side lobes to ±45° relative to the vertical plane. Rotation minimizes clutter returns that mask weaker power returns and generates larger mean side lobe path loss. The higher sidelobe power levels are directed away from the critical area along the runway during approach.

In a further aspect, individual array elements may be counter rotated relative to the array lattice to maintain desired antenna polarization state.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which:

FIG. 5A shows a block diagram of electromechanically steered passive directional arrays and ESA radiating elements according to an exemplary embodiment;

FIG. 5B shows a block diagram of electromechanically steered passive directional arrays and ESA radiating elements according to an exemplary embodiment;

DETAILED DESCRIPTION

Figure 1:
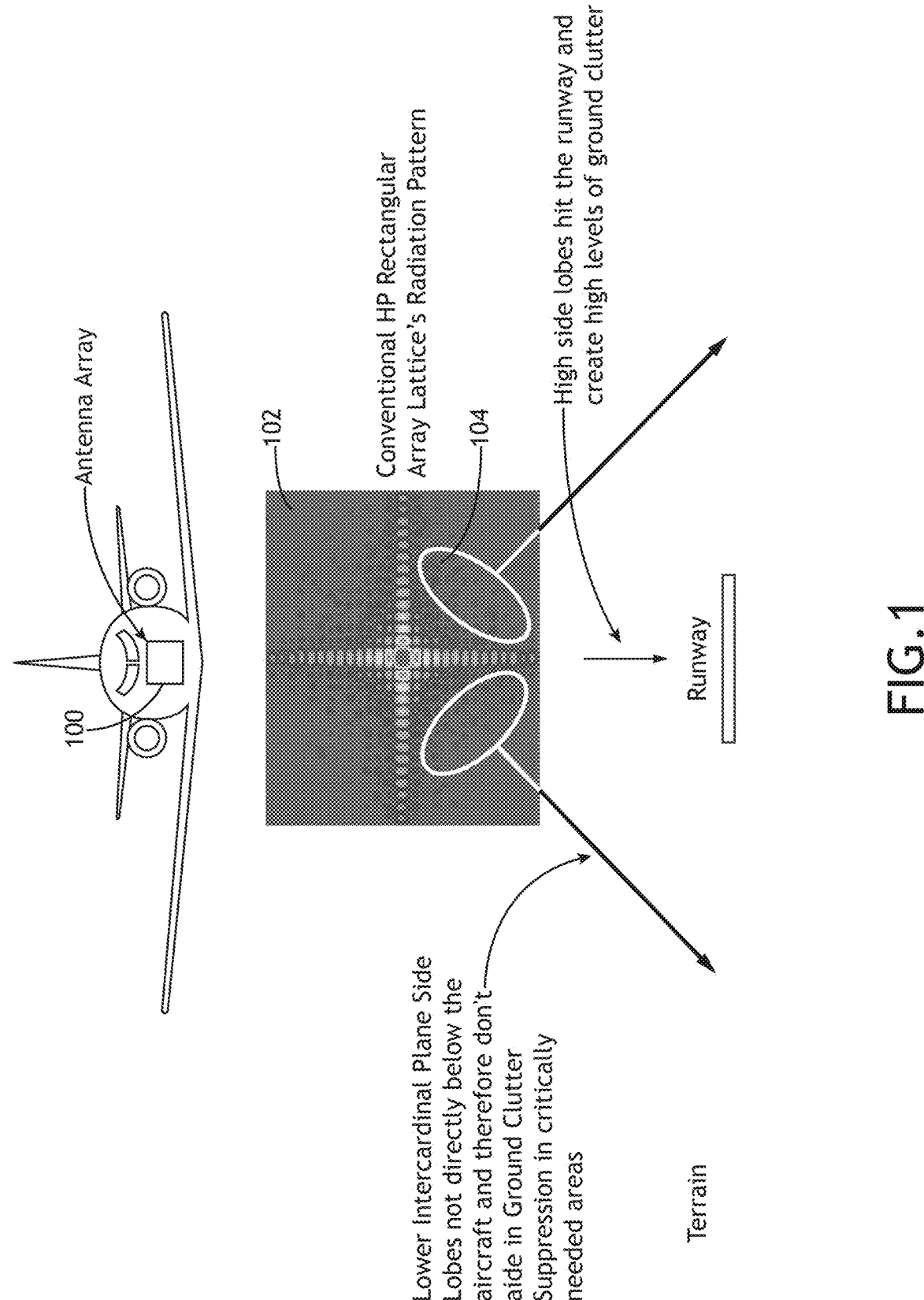
FIG. 1 shows a diagram of electromechanically steered passive directional arrays and ESA side lobe levels.

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of a feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to an electromechanically steered passive directional arrays and ESA antenna where the apertures' electromechanically steered passive directional arrays and ESA's rectangular array lattice is a mathematically separable function such that the array lattice is rotated to rotate the higher cardinal plane side lobes to ±45° relative to the vertical plane. Rotation minimizes clutter returns that mask weaker power returns and generates larger mean side lobe path loss. The higher sidelobe power levels are directed away from the critical area along the runway during approach. Individual array elements may be counter rotated within the array lattice to maintain desired antenna polarization state.

Figure 2:
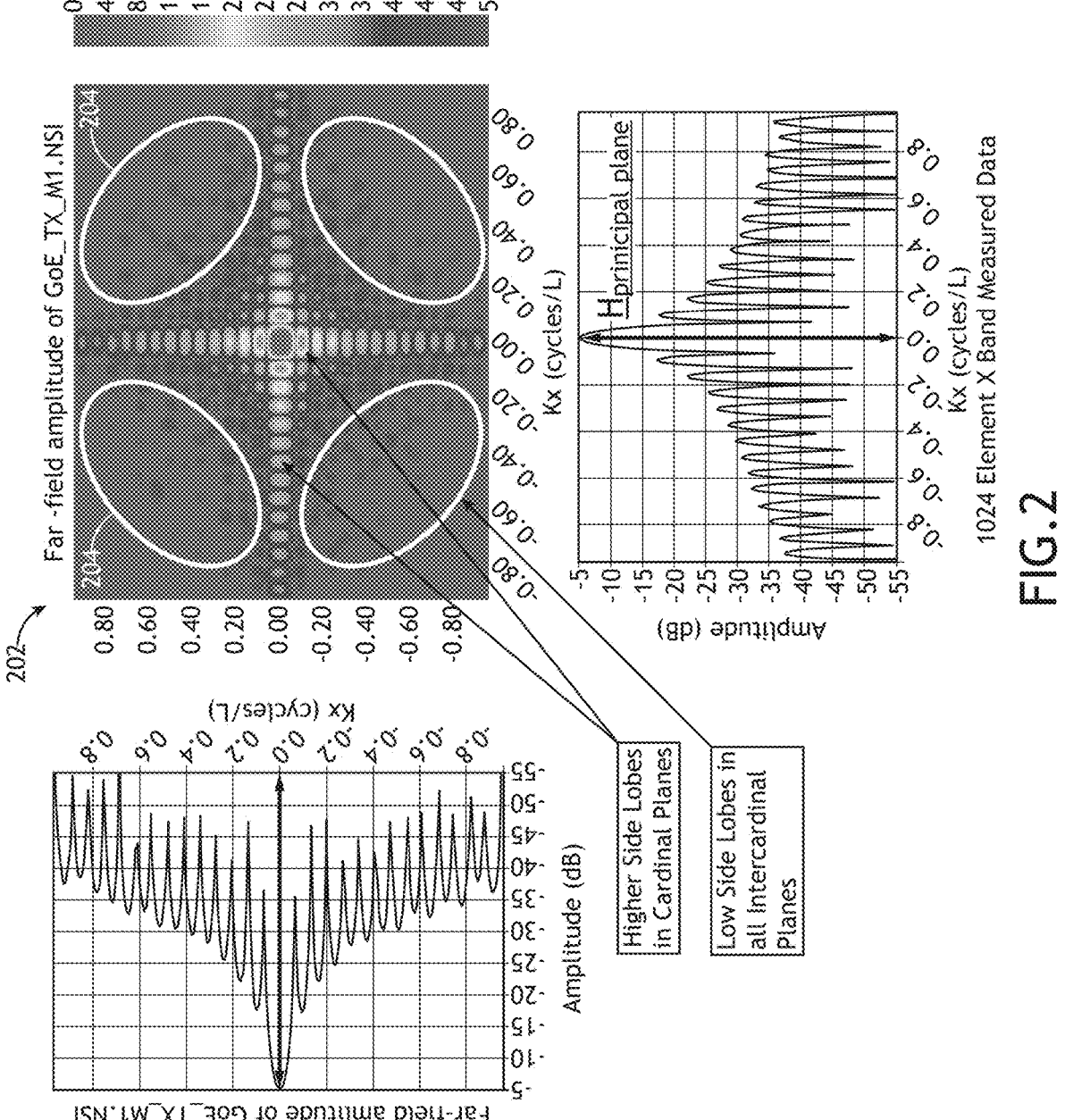
FIG. 2 shows a diagram of electromechanically steered passive directional arrays and ESA side lobe levels.

Referring to FIGS. 1 and 2, diagrams of electromechanically steered passive directional arrays and ESA side lobe levels are shown. Aircraft include radar arrays 100 with modes with radiation patterns 102, 202 that suffer from high side lobe induced ground clutter. Rectangular array lattices directional antenna arrays place the cardinal plane side lobes directly downward, below and in front of the aircraft during runway approach, which in turn maximizes undesirable ground clutter which then returns from the direction of the intercardinal plane side lobes 104, 204.

Figure 3:
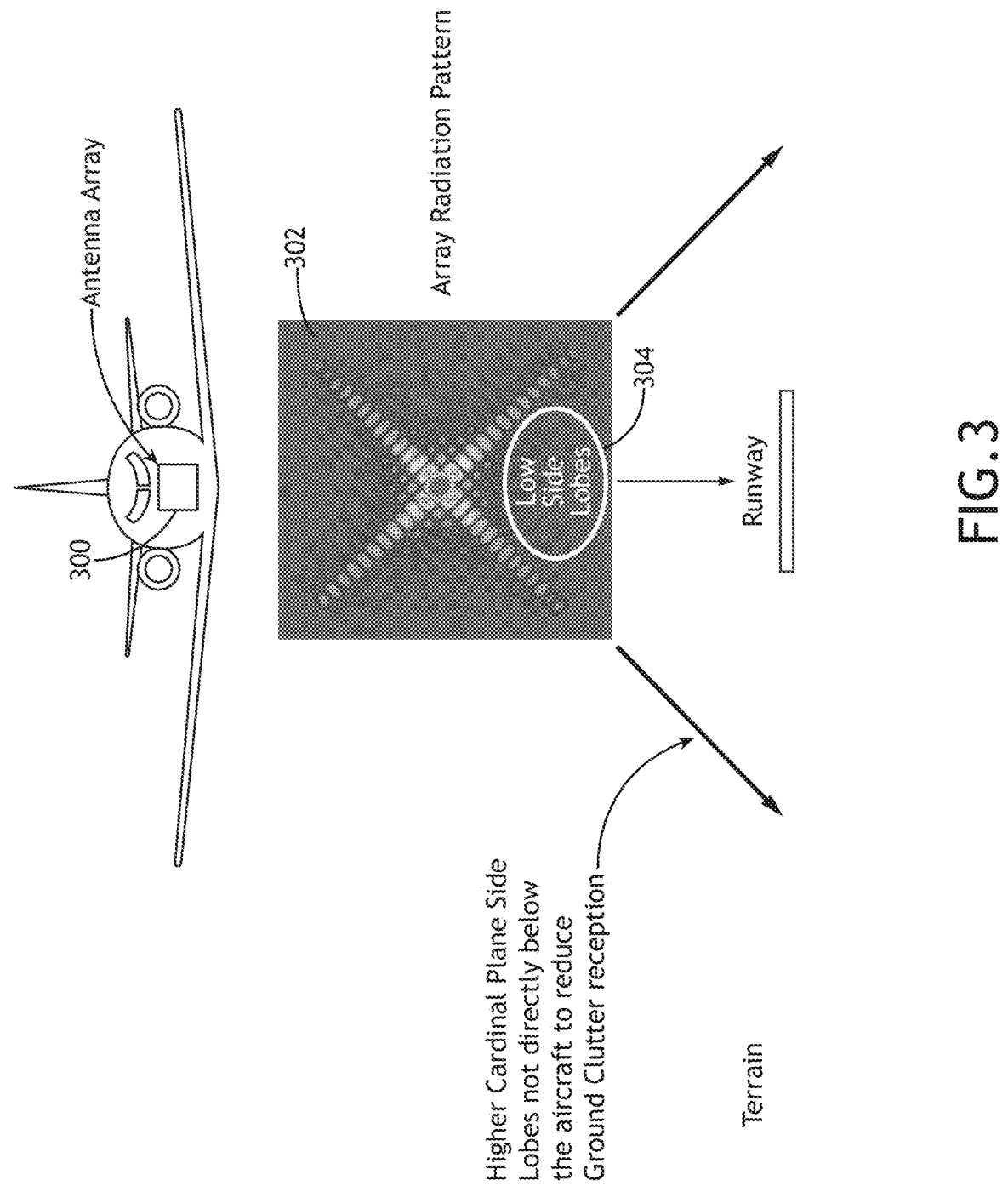
FIG. 3 shows a diagram of electromechanically steered passive directional arrays and ESA side lobe levels according to an exemplary embodiment.

Referring to FIG. 3, a diagram of electromechanically steered passive directional arrays and ESA side lobe levels according to an exemplary embodiment is shown. An aircraft includes a radar array 300 where the electrical array lattice within 302 is rotated 45°. Rotating the electrical aperture 302 places the intercardinal side lobes 304 directly down, and the cardinal side lobes at 45°, reducing ground clutter caused by the cardinal side lobes.

The radar array 300 does not have to be rotated mechanically. The radiation elements may be rotated electrically and positioned on a substrate such that the cruciform side lobes are not directed at the ground. From a slant range perspective, those side lobes would be directed further away from the aircraft. Side lobes 304 are thereby minimized.

Figure 4A:
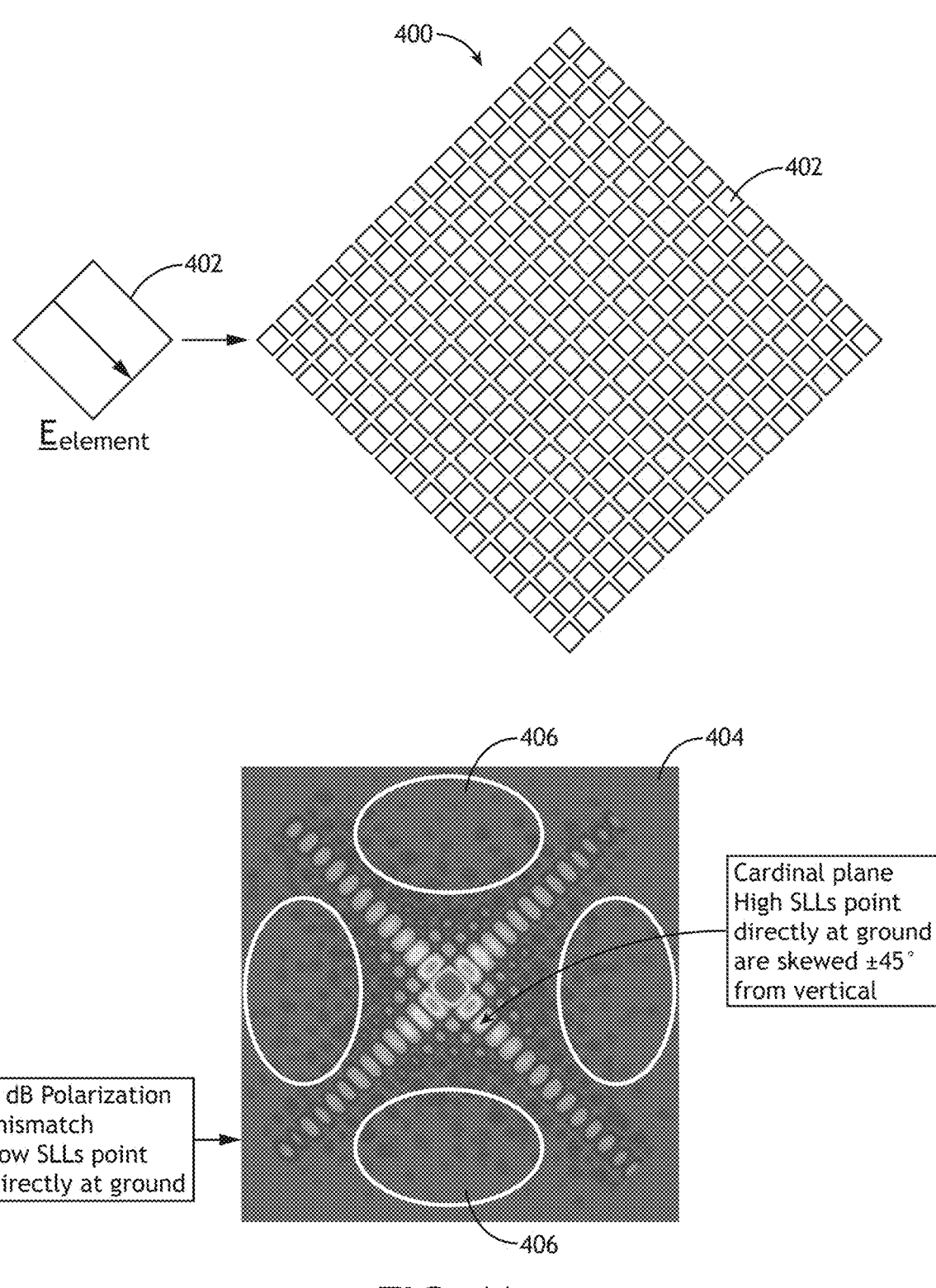
FIG. 4A shows an electromechanically steered passive directional arrays and ESA and side lobe levels according to an exemplary embodiment.
Figure 4B:
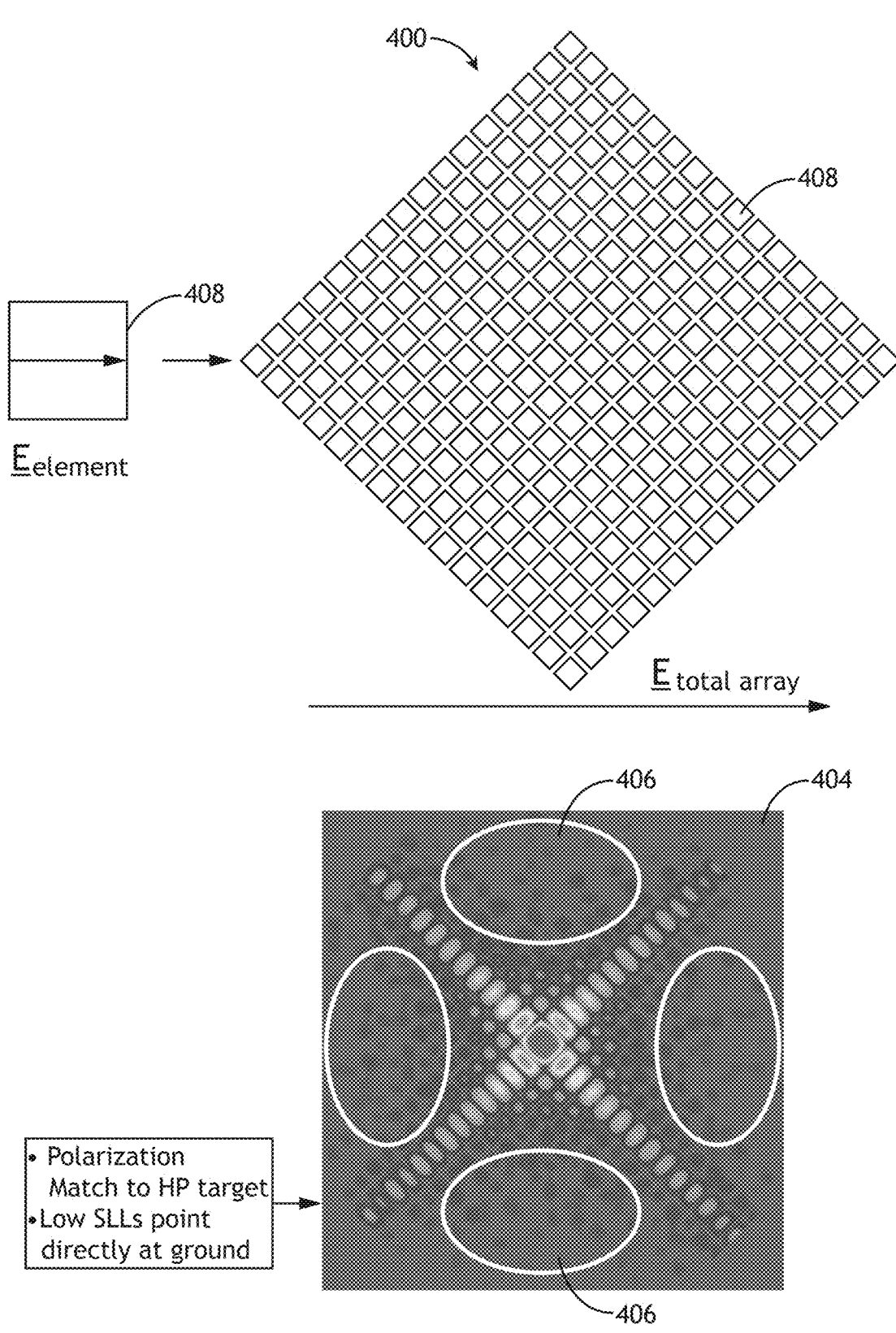
FIG. 4B shows an electromechanically steered passive directional arrays and ESA and side lobe levels according to an exemplary embodiment.

Referring to FIGS. 4A-4B, electromechanically steered passive directional arrays and ESAs and side lobe levels according to exemplary embodiments are shown. An electromechanically steered passive directional arrays and ESA 400 includes a plurality of radiating elements 402. The radiating elements 402 are rotated relative to the array lattice such that low side lobe regions 406 of the radiation pattern 404 are directed to reduce ground clutter. It may be appreciated that the depiction of the electromechanically steered passive directional arrays and ESA 400 illustrates electrical rotation of the array lattice and does not necessarily imply the physical contour of the array is rotated. The contour of the physical array is arbitrary.

Rotating the electromechanically steered passive directional arrays and ESA 400 produces a polarization mismatch for linear polarization. In certain classes of antennas, it is possible to rotate each of individual radiating element 408 to get the original polarization while still producing advantageous side lobes 406.

In at least one embodiment, radiating elements 402 may be configured to polarize in multiple directions. Radiating elements 402 may be configured to polarize electrically independent of the position of the cruciform sidelobes.

Referring to FIGS. 5A-5B, block diagrams of electromechanically steered passive directional arrays and ESA radiating elements 500, 502, 504 according to exemplary embodiments are shown. An array of radiating elements 500, 502, 504 is organized wherein the array lattice is rotated such that individual radiating elements 502, 504 may be rotated. For example, radiating elements 502, 504 may be rotated by ±45°. Such rotation may dispose side lobes at ±45°. Furthermore, the radiating elements 504 may be electronically rotated to produce a polarization pattern generally corresponding to an unrotated polarization, or a polarization corresponding to an original orientation as compared to the rotated array lattice.

It may be appreciated that physical or mechanical rotation of the radiating element relative to the array lattice creates a polarization state change of the radiating element. The physical or mechanical rotation effectively results in an "electric" rotation in the sense the electromagnetic polarization state. Such embodiments are "hard wired" embodiments of a polarization matched offset principal plane side lobe level concepts. FIGS. 4A-4B and 5A illustrate such embodiments for single input/output linear polarized radiating elements. FIG. 5B illustrates the same physical or mechanical rotation for dual orthogonal linearly polarized radiating elements with two distinct RF input/output ports.

Within a directional array, most commonly an AESA or ESA, when utilizing dual orthogonal linearly polarized radiating elements with two distinct RF input/out ports, it is possible to electronically and dynamically adjust the phase difference between each radiating element's two input/output ports using analog RF active circuitry (e.g. RFIC) to arbitrarily create any polarization state without any physical rotation of the radiating element.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. An ESA antenna apparatus comprising a plurality of radiating element, wherein:
   the plurality of radiating elements are disposed in an array within a rectangular array lattice;
   the rectangular array is configured to produce a first set of sidelobes along a cardinal plane and a second set of sidelobes along an intercardinal plane;
   the first set of side lobes having a higher relative amplitude than the second set of side lobes; and
   the array being disposed to direct the intercardinal plane at a runway during a landing procedure.

2. The ESA antenna apparatus of claim 1, wherein the array lattice is rotated by ±45°.

3. The ESA antenna apparatus of claim 2, wherein the radiating elements are electronically rotated to produce a polarization state corresponding to a polarization state of an unrotated co-polarized array lattice.

4. The ESA antenna apparatus of claim 2, wherein the radiating elements are electronically rotated to produce an arbitrary polarization state.

5. The ESA antenna apparatus of claim 1, wherein the radiating element's polarization states are electronically rotated to produce a polarization corresponding to a polarization state of an unrotated array lattice.

6. The ESA antenna apparatus of claim 5, wherein the radiating elements are electronically rotated to produce an arbitrary polarization state.

7. A radar system comprising an ESA antenna comprising a plurality of radiating elements, wherein:

the plurality of radiating elements are disposed in an array;

the rectangular array is configured to produce a first set of sidelobes along a cardinal plane and a second set of sidelobes along an intercardinal plane;

the first set of side lobes having a higher relative amplitude than the second set of side lobes; and the array being disposed to direct the intercardinal plane at a runway during a landing procedure.

8. The radar system of claim 7, wherein the array lattice is rotated by +45°.

9. The radar system of claim 8, wherein the radiating elements are electronically rotated to produce a polarization state corresponding to a polarization of an unrotated array.

10. The radar system of claim 8, wherein the radiating elements are electronically rotated to produce an arbitrary polarization state.

11. The radar system of claim 7, wherein the radiating elements are electronically rotated to produce a polarization state corresponding to a polarization state of an unrotated array.

12. The radar system of claim 11, wherein the radiating elements are electronically rotated to produce an arbitrary polarization state.

13. The radar system of claim 7, wherein the array is configured to rotate from a first orientation of 0° polarization state to a second orientation of ±45° polarization state.

14. An aircraft comprising an ESA antenna comprising a plurality of radiating elements, wherein:

the plurality of radiating elements are disposed in an array;

the rectangular array is configured to produce a first set of sidelobes along a cardinal plane and a second set of sidelobes along an intercardinal plane;

the first set of side lobes having a higher relative amplitude than the second set of side lobes; and the array being disposed to direct the intercardinal plane at a runway during a landing procedure.

15. The aircraft of claim 14, wherein the array lattice is rotated by ±45°.

16. The aircraft of claim 15, wherein the radiating elements are electronically rotated to produce a polarization corresponding to a polarization of an unrotated array lattice.

17. The aircraft of claim 15, wherein the radiating elements are electronically rotated to produce an arbitrary polarization state.

18. The aircraft of claim 14, wherein the radiating elements are electronically rotated to produce a polarization state corresponding to a polarization of an unrotated array lattice.

19. The aircraft of claim 18, wherein the radiating elements are electronically rotated to produce an arbitrary polarization state.

20. The aircraft of claim 14, wherein the array is configured to rotate from a first orientation of 0° polarization state to a second orientation of ±45° polarization state.

* * * * *